United States Patent
Eichstaedt et al.

(10) Patent No.: US 7,143,118 B2
(45) Date of Patent: Nov. 28, 2006

(54) METHOD AND SYSTEM FOR ALERT DELIVERY ARCHITECTURE

(75) Inventors: Matthias Eichstaedt, Sunnyvale, CA (US); Thyagarajapuram S. Ramakrishnan, Saratoga, CA (US); Patrick Loo, Fremont, CA (US); Jayachandran R. Menon, Cupertino, CA (US); Sotiris Matzanas, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 10/866,064

(22) Filed: Jun. 11, 2004

(65) Prior Publication Data
US 2005/0027741 A1 Feb. 3, 2005

Related U.S. Application Data

(60) Provisional application No. 60/478,401, filed on Jun. 13, 2003.

(51) Int. Cl.
G06F 17/30 (2006.01)
G06F 15/16 (2006.01)

(52) U.S. Cl. .................. 707/201; 707/200; 709/228; 715/513

(58) Field of Classification Search .............. 707/1, 707/10, 200, 201; 709/228; 705/1, 7; 713/17; 711/4; 715/513
See application file for complete search history.

(56) References Cited

U.S. PATENT DOCUMENTS

| | | | |
|---|---|---|---|
| 4,922,491 A | 5/1990 | Coale | |
| 5,454,074 A | 9/1995 | Hartel et al. | |
| 5,758,088 A | 5/1998 | Bezaire et al. | |
| 6,021,433 A | 2/2000 | Payne et al. | |
| 6,167,426 A | 12/2000 | Payne et al. | |
| 6,332,141 B1 | 12/2001 | Gonzalez et al. | |
| 6,459,913 B1 | 10/2002 | Cloutier | |
| 6,718,332 B1 | 4/2004 | Sitaraman et al. | |
| 6,735,614 B1 | 5/2004 | Payne et al. | |
| 2002/0080948 A1* | 6/2002 | Canali et al. | 379/229 |
| 2003/0033179 A1* | 2/2003 | Katz et al. | 705/7 |
| 2003/0110262 A1 | 6/2003 | Hasan et al. | |
| 2004/0038664 A1 | 2/2004 | Stoks | |

(Continued)

OTHER PUBLICATIONS

International Search Report for PCT/US04/18541.
International Search Report for PCT/US04/18542.

*Primary Examiner*—Hosain Alam
*Assistant Examiner*—Hassan Mahmoudi
(74) *Attorney, Agent, or Firm*—Darby & Darby PC; Thomas R. Marquis (57) ABSTRACT

An architecture for providing an alert message based on content that may be received as an event based feed or a time based feed in one or more formats. The architecture includes a data collection processing module for normalizing the content into a predefined data structure, and indexing the content for processing large amounts of content according to selected characteristics. A matching engine employs user queries to associate the event based content with one or more users who have indicated an interest in receiving alert messages associated with selected content. The matching engine also generates the corresponding alert messages. A poller fetches content on behalf or users at a predefined period and generates a corresponding alert message. A delivery interface determines which alert messages are to be sent immediately and which alert messages are to be scheduled for later delivery. The architecture is mirrored for scalability and backup.

22 Claims, 7 Drawing Sheets

U.S. PATENT DOCUMENTS

| | | |
|---|---|---|
| 2004/0044774 A1 | 3/2004 | Mangalik et al. |
| 2004/0078340 A1 | 4/2004 | Evans |
| 2004/0133794 A1 | 7/2004 | Kocher et al. |
| 2004/0143667 A1* | 7/2004 | Jerome ..................... 709/228 |

* cited by examiner

METHOD AND SYSTEM FOR ALERT DELIVERY ARCHITECTURE

CROSS-REFERENCE TO RELATED APPLICATIONS

This Utility Application claims priority from U.S. Provisional Application No. 60/478,401, filed Jun. 13, 2003, the benefit of the earlier filing date is hereby claimed under 35 U.S.C. 119(e).

FIELD OF THE INVENTION

The present invention is generally directed to messaging, and more particularly, to enabling the delivery of alerts over a network.

BACKGROUND OF THE INVENTION

Some services have provided users with alerts of specialized content such as stock quotes. These alert services generally provide content on a single topic to users registered with a specific service. To obtain alerts on multiple topics, a user typically registers with multiple services.

DETAILED DESCRIPTION OF THE INVENTION

The present invention now will be described more fully hereinafter "with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification, the term "connected" means a direct connection between the things that are connected, without any intermediary devices or components. The term "coupled," means a direct connection between the things that are connected, or an indirect connection through one or more either passive or active intermediary devices or components. The meaning of "a," "an," and "the" include plural references. The meaning of "in" includes "in" and "on."

Briefly stated, the invention is direct to a system and method for enabling a user to register an interest and subsequently provide a notification (an alert) to the user when new information becomes available regarding the registered interest. There are several types of content that could be of interest to a user, including, but not limited to, stock feeds, news articles, personal advertisements, shopping list prices, images, search results, and the like. Also, alerts can be provided to the user with any, or all, of a variety of delivery methods, including, but not limited to, instant messaging (IM), email, Short Message Service (SMS), Multimedia Message Service (MMS), voice messages, and the like.

In some cases, a user could select alerts for certain registered interests to be provided by all available methods and other alerts for other registered interests to be provided by only one method. Additionally, some alerts may be provided with a push method to provide relatively immediate notification. In this case, the invention would employ stored contact information to deliver the alert to the user with all selected delivery methods. In contrast, other alerts can be provided with a pull method that replies with the alerts in response to requests from a user regarding other registered interests. The requests can also be scheduled predefined times to provide periodic alerts.

For users that communicate with the invention from behind some Network Address Translation (NAT) device on a network, the pull method employs the connection established by the user's pull request to send the alert to the user. How often the pull alerts are provided is determined by the frequency with which a user makes a pull request of the invention. However, for other users that are not communicating with the invention through a NAT, the push method can be employed at selected time intervals to provide less than urgent alerts.

History of alerts can be provided on a web page for a user. Also, queries for processing alerts for substantially the same registered interests can be combined to enable scaling of the invention to relatively large numbers of users. To further enable scalability, boolean pre-processing and pre-indexing of queries can be applied to new content information for registered interests as the new content information becomes available, such as through an extensible markup language (XML) feed. User profiles can also be provided that include various information, including, but not limited to, Boolean queries for registered interests, delivery methods, time schedules, and the like.

Figure 1:
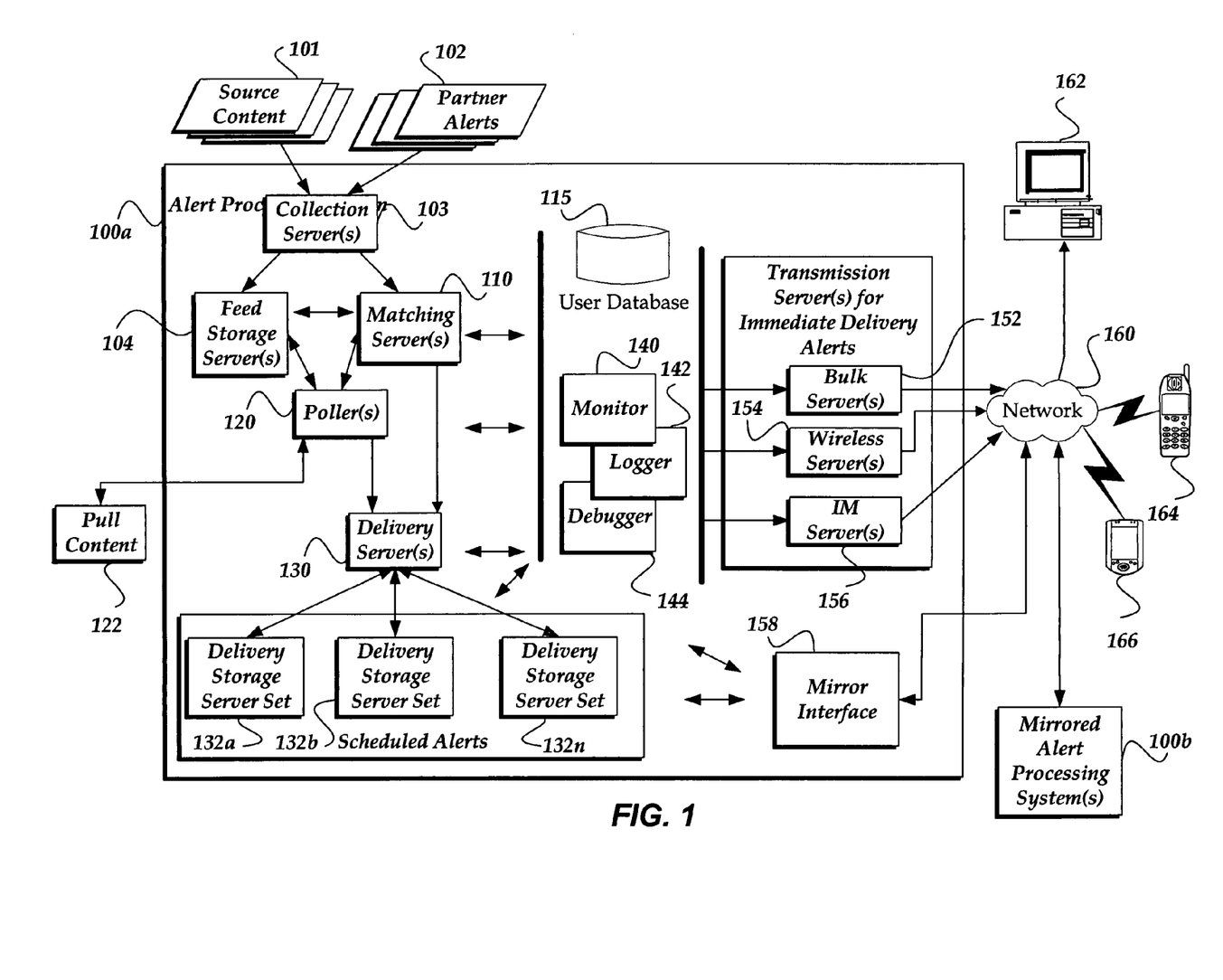
FIG. 1 illustrates an exemplary alert architecture in accordance with the present invention.

FIG. 1 illustrates an exemplary alert architecture in accordance with the present invention. The alert architecture can be implemented with one or more software modules and/or one or more computing devices such as servers, client devices, and the like. The computing devices generally include a processor, a memory, a communication interface, and input/output interface, a storage device, and/or other conventional computing components. An alert processing system 100a accesses source content 101, partner alerts 102, pull content 122, and/or other content information for distribution as alerts to client devices. Source content 101 can comprise a variety of content such as personal advertisements, shopping prices, news articles, and the like. Partner alerts 102 further comprise content such as stock quotes, auction bids, and the like that may already be provided as an alert from a topical service. Source content 101 and/or partner alerts 102 can be pushed and/or pulled content. In other words, source content 101 and/or partner alerts 102 can be event based feeds of content and/or scheduled time based feeds of content. One or more feed collection servers 103 receive content and perform input processing as described in further detail with regard to FIGS. 2 and 3. For content that is not immediate processed, collection servers 103 send the content to storage servers 104.

One or more matching servers 110 associate content with users who have indicated an interest in receiving alerts about selected content. Generally, matching servers 110 are employed when a content source pushes in content, which is not already associated with a user request. An interest in receiving one or more types of alerts is indicated in user profiles, which are stored in a user database 115. The user profiles include user identifiers, desired alert types, desired delivery method, and other information. A poller 120 manages requests for content on behalf of users. Generally, poller 120 initiates access to content from content sources. Poller 120 can access some independent pull content 122 from content sources that do not push content to collection servers 103.

One or more delivery servers 130 are in communication with matching servers 110 and poller 120. Delivery servers 130 access pull content 122 from poller 120, pushed content from matching servers 110, and user information from user database 115. Delivery servers 130 prioritize and manage distribution of alerts for immediate and pre-scheduled delivery. Pre-scheduled alerts are stored on one or more storage server sets 132a–132n. Each set can correspond to a type of alert, a delivery method, and/or other characteristics. As alerts are prepared and delivered, a user monitor 140 watches the flow of alerts for patterns and/or other insights. Monitor 140 can also track and/or access information about user behaviors, such as navigating to Web sites, making online purchases, and the like. The tracked behaviors also indicate user interests which are stored in user profiles in user database 115. A logger 142 tracks data associated with individual users, alert types, and other parameters. A debugger 144 is used to trouble shoot problems with processing alerts. When an alert is to be delivered, it is routed to one or more appropriate servers for delivery by the user's preferred method(s). For example, email alerts can be delivered via bulk servers 152. Alerts to wireless mobile devices can be delivered via wireless servers 154. Instant message alerts can be delivered via instant message servers 156. Each alert is generally communicated over a network 160 to a client device identified in the user profile. The user can indicates that the alert be delivered to one ore more of a personal computer (PC) 162, a mobile terminal 164, a hand-held computer 166, and/or the like.

A mirror interface 158 can also be used to communicate with one or more mirrored alert processing systems 100b. All, or portions of the data and processing operations introduced above can be reproduced for parallel processing in the same and/or different locations. Mirror interface 158 can comprise a central communication interface and/or be distributed within each of the servers discussed above, so that each server type can communicate with mirrored server types. At each mirrored alert processing system, the operations of each server type can be customized for locally unique factors.

Figure 2:
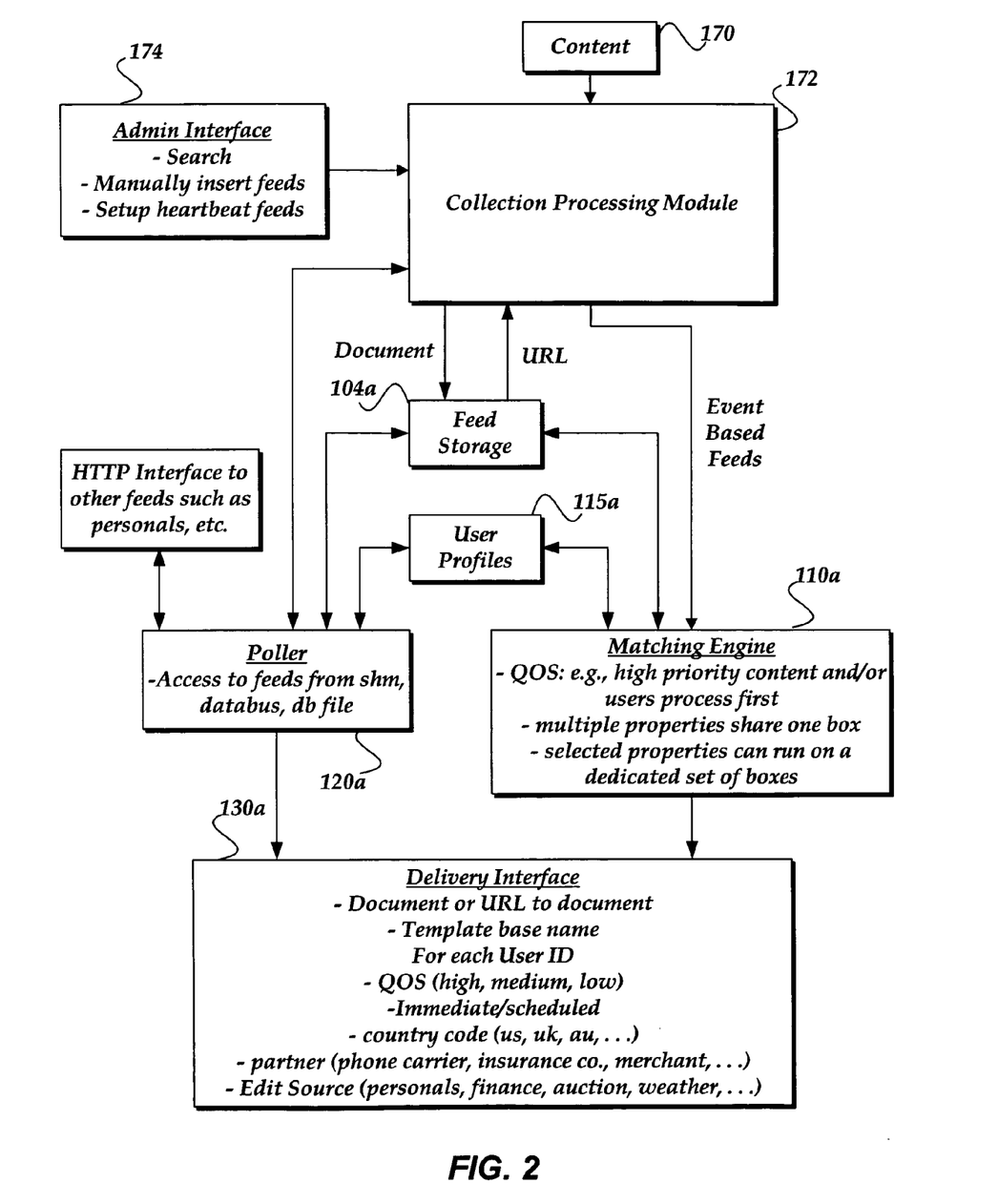
FIG. 2 is a functional block diagram illustrating relationships and data flows among functional elements corresponding to the architecture described with regard to FIG. 1.

FIG. 2 is a functional block diagram illustrating relationships and data flows among functional elements corresponding to the architecture described with regard to FIG. 1. Pushed or pulled source content 170 is receive in one or more forms, including as a hypertext markup language (HTML) document, as an XML document, as a text file, as an email message, as an instant message, and the like. As needed, a collection processing module 172 performs one or more pre-processing operations on the received content to normalize the various forms of content that are received. Normalized content documents are generally indexed by source, time-stamp, content type, and/or other characteristics for easy storage and retrieval in a feed storage 104a, which also assigns a universal resource locator (URL) based on the storage directory path. The URL is made available to collection processing module 172 for later retrieval. Collection processing is described in further detail with regard to FIG. 3.

An administration interface 174 is available to access the received data for review and/or administrative functions such as obtaining a status, searching, manually inputting content, and the like. Administrative interface 174 can also be used to set up heartbeat feeds of test content that are tracked to ensure the system is operating properly.

If the content was pushed in from an event based feed, such as a stock price source, the content is relayed to a matching engine 110a. This relay and/or other communications, such as a time based feed, can be performed via a replicate feed that enables data to be copied from one server to another server. Alternatively, the relay and/or other communications can be performed via a databus feed that enables data to be broadcast until received by all intended recipients. The matching engine determines the users to which an alert should be sent about the received content. The matching engine accesses user profile data 115a from the user database to associate the content with users who have indicated a desire, or otherwise selected to receive an alert about the content. In particular, a user profile indicates one or more content types for which the user desires an alert, such as traffic incidents, stock quotes, and the like. The user's profile also indicates one or more Boolean queries comprising one or more logical operators, such as AND, OR, NOT, and the like. A sample Boolean query in a user profile is illustrated as:

Stock and (Company and Price>$100)

If incoming content type comprises a stock quote, matching engine 110a applies the Boolean query to determine whether the stock quote content includes information about the selected company and a price greater than $100. If the stock quote does include matching content, matching engine 110a adds the user to a list of users who desire an alert about the matching content.

Many other users can have a similar query, and/or match the incoming content with different queries. To improve performance for scalability, matching engine 110a maintains an index of queries and associates each query to those users who desire the same, or very similar, query results. The index of queries reduces duplication of query operations. Future incoming content can be resolved against these pre-indexed queries. For any queries that result in a match, the corresponding user identifier is added to the list. Also taken from the user's profile and included in the list is the user's desired method of delivery such as by email, by instant message, by cellular phone, and the like. Similarly, a desired time for delivery can be specified in the user profile. A message limit can also be provided in the user profile to limit the number of alerts and/or other messages that are sent to the user. The queries can be distributed among computing devices based on the type of content, the current load on the computing devices, and/or other properties. When all queries have been performed for the content, matching engine 110a prepares to relay the content and list to a delivery interface 130a.

Prior to relay, matching engine 110a can also determine priorities based on the user profile data, the type of content, the type(s) of alerts to be sent, and the like. A priority is sometimes referred to as a quality of service (QOS) level. For example, stock price content is typically very time sensitive, so the matching engine can apply a higher priority (e.g., high QOS level) on matching stock price content to users. As another example, the matching engine can use user profile data 115a to prioritize outgoing alerts to users according to paid service plans and/or other characteristics.

For pulled content using a scheduled time based feed, a poller 120a requests content for one or more users who desire an alert on an indicated content type. Poller 120a can pull content from collection processing module 172 or directly from external sources that may not be pre-arranged to feed content to collection processing module 172. External content is normalized and otherwise pre-processed in the manner described above, unless the requested content is pre-processed by the content sourced prior to be sent to poller 120a. Further detail regarding the poller processes is described below with regard to FIGS. 4 and 5.

In any case, when content is to be delivered to an end user, a delivery interface 130a shown in FIG. 2 generates alerts in one or more methods desired by users. For example, some users may desire alerts delivered as short message service (SMS) messages to a cellular phone number. Delivery interface 130a generally uses a template corresponding to the delivery method. The template is applied to a content document or a URL to the content document to generate the final alert. Delivery interface 130a also manages the timing and/or other QOS aspects of alert delivery for each user. For example, some alerts are delivered immediately, while other alerts can be scheduled for later delivery. Other examples include arranging for routing based on geographic location, business partners, content sources, and/or other parameters. Delivery interface 130a also manages undeliverable alerts, and/or other maintenance issues. Further detail regarding delivery is discussed below with regard to FIG. 6.

Content Data Collection Processing

Figure 3:
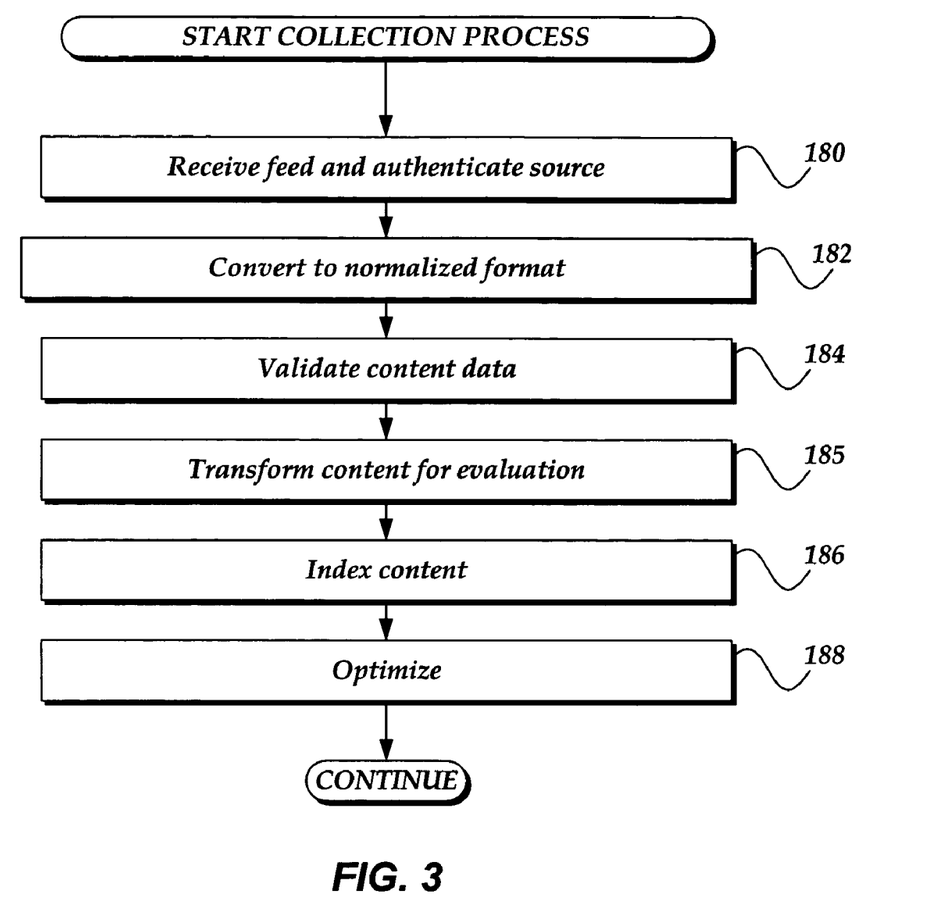
FIG. 3 is a flow diagram illustrating exemplary logic for processing collected content.

Further detail is not described regarding content collection processing. FIG. 3 is a flow diagram illustrating exemplary logic for processing collected content. When content is received, the source is authenticated at an operation 180. Authentication and/or other security measures can be implemented in one or more ways, including via digital certificates, digital signatures, encryption, virtual private network tunnels, and the like. The source for the content can also be authenticated with domain security mechanisms, including, but not limited to, a domain key application such as provided by Yahoo!, Inc.

At an operation 182, the received content is converted to a normalize content format, such as an XML format. Table 1 illustrates a sample XML data structure to which received content is normalized for further processing and eventual delivery as an alert.

TABLE 1

| | Sample XML Data Structure |
|---|---|
| Contact | An email address where parse error and data inconsistency can be reported |

TABLE 1-continued

| | Sample XML Data Structure |
|---|---|
| Country | The country code of the feed |
| Date | The date of the document |
| ExpirationDate | The expiration date of the content |
| Url | The url |
| ArchiveUrl | The url for the alerts feed archive |
| FeedProvider | The name of the feed provider (Reuters, AP) The feed providers need to be verified from a config file. |
| Type | The type of feed. This field works in conjunction with the edit pages. The edit page saves each alert with a specific type. Each alert type is a string, for example finance/quotes/real-time/personals. |
| Title | The title of the document. |
| Alert_Data | The children of this tag can contain any additional data and tags that is needed for the email formatting. Each child tag will be available to the email formatting system as key-value pair. |

The following code illustrates a sample normalized XML content document regarding a traffic incident that can be used to generate an alert.

```
<?xml version="1.0" encoding="UTF-8"?>
<AlertsDocument>
<Contact>shi@yahoo-inc.com</Contact>
<Country>US</Country>
<Date>1048495620000</Date>
<ExpirationDate>1048497420000</ExpirationDate>
<Url>http://alerts.yahoo.com/</Url>
<Feed>us_traffic</Feed>
<Type>traffic</Type>
<Title matching=1>
Disabled vehicle
</Title>
<Abstract matching=1>
Disabled Vehicle
</Abstract>
<Body>
Some more descriptive about the incident.
</Body>
<Alert_Data>
< DESC>Disabled Vehicle</ DESC>
< LATITUDE>38.554289</ LATITUDE>
< LONGITUDE>-121.406181</ LONGITUDE>
< SEVERITY>2</ SEVERITY>
< STATE>CA</ STATE>
< MARKETCODE>SAC</ MARKETCODE>
< ENDTIME>Mon Mar 24 09:17:00 2003</ ENDTIME>
< ITISCODE>211</ ITISCODE>
<ITISMESSAGE> Some more descriptive about the
incident.</ITISMESSAGE>
...
</AlertData>
</AlertsDocument>
```

At an operation 184, the collection processing module validates the content to verify that necessary data was included from the source. Validation can also include updating and/or removing duplicate content that was previously received, and/or ensuring other data integrity aspects. Additionally, validation can include verifying the content as received correctly from the authenticated source. The verification can include validation of encryption/decryption, digital signatures, digital certificates, passwords, symmetric key pairs, asymmetric key pairs, and the like.

Typically, a normalized XML content document can be processed without further modification. However, some modifications can be applied to during a feed transformation operation 185. In many cases, content feed transformation would comprise minor formatting conversions or simple string substitutions to address validation problems. Nevertheless, more complex logical operations can be performed. For example, an incoming stock quote can be compared to a previous stock quote to determine whether a predefined percentage change has occurred in the stock price. There may be a large number of users who requested an alert when the price of a certain stock changed by a certain percentage since a day's market opening. The collection processing module can pre-calculate a current percentage change prior to associating the stock quote data with users, so that processing resources need not be used or duplicated in determining whether an alert should be sent to the large number of users.

At an operation 186, the collection processing module also indexes the content to store, search, retrieve, track, and/or organize the content based on a number of metrics. Some of the metrics are inherent in the normalized data structure of the normalized content document, however, the metrics can also be stored in an index document for status information and reports. Example metrics can include the time at which the content was received, an identifier of the sender, a country from which the content was sent, a type of the content, whether the content is associated with a poll request, whether the content is associated with previously received content, and the like. In addition to easing access to a large amount of incoming content, the collection processing module can use the metrics to perform housekeeping and optimization, such as deleting duplicate content, filtering the content to identify minor revisions, and the like, at an operation 188. For instance, a spelling error may be corrected in a news article, and resent from a content source. A user is unlikely to want two alerts of the same news article with only the spelling correction. If the first news article was already sent, then the second version can be deleted unless difference threshold is exceeded. Alternatively, if the news article was not already sent as an alert, the first version of the news article can be replaced with the corrected version, and queued up so that only one alert is sent to users at a scheduled time. The index document of metrics and/or the content document are generally stored in the feed storage. Each stored index document is identified by an index universal resource locator (URL) for easy access to the index information.

Throughout the above operations, the collection processing module can insert tags and/or other code to assist the matching engine. For example, with regard to the sample XML document described above, the collection processing module can apply an optional 'matching' attribute to each immediate CDATA child of the <AlertsDocument> tag. The matching engine can scan the document for 'matching' tags and apply the query expression(s) to the text element to determine the user identifiers that match the document.

Poller Subsystem

Figure 4:
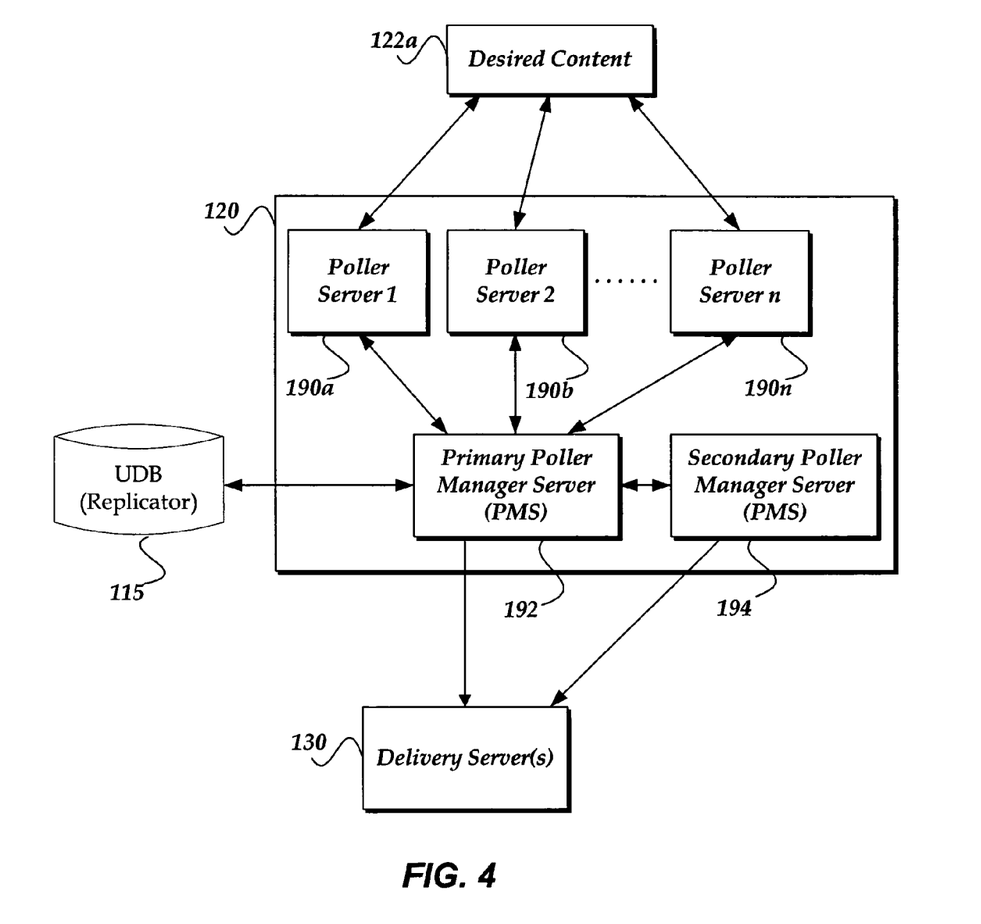
FIG. 4 illustrates a poller architecture for managing polled content to produce scheduled alerts.

FIG. 4 illustrates a poller architecture for managing polled content to produce scheduled alerts. There are N numbers of poller servers 180a through 180n, and at least two poller manager servers (PMSs), including a primary PMS 182 and a secondary PMS 184, which generally acts as a backup. Each poller server runs a number of processes that uses non-blocking I/O to handle a number of polls from one or more desired content sources 122a based on the alert type, such as a personal advertisement, a weather notice, and the like. The desired content could be communicated to poller 120 from the collection processing module and/or accessed independently, such as through an HTTP interface. Each poller server stores identical alerts information per user identifier in database files such as 96 Berkeley DB files. Each file represents a time slot such as 15 minutes-24×4. When an alert request is inserted into the user's profile in user database 115, a QOS value is calculated based on a provider code, alert type, premium flag, and/or the like. A scheduled alert is communicated to delivery server(s) 130 for distribution at a corresponding period.

Figure 5:
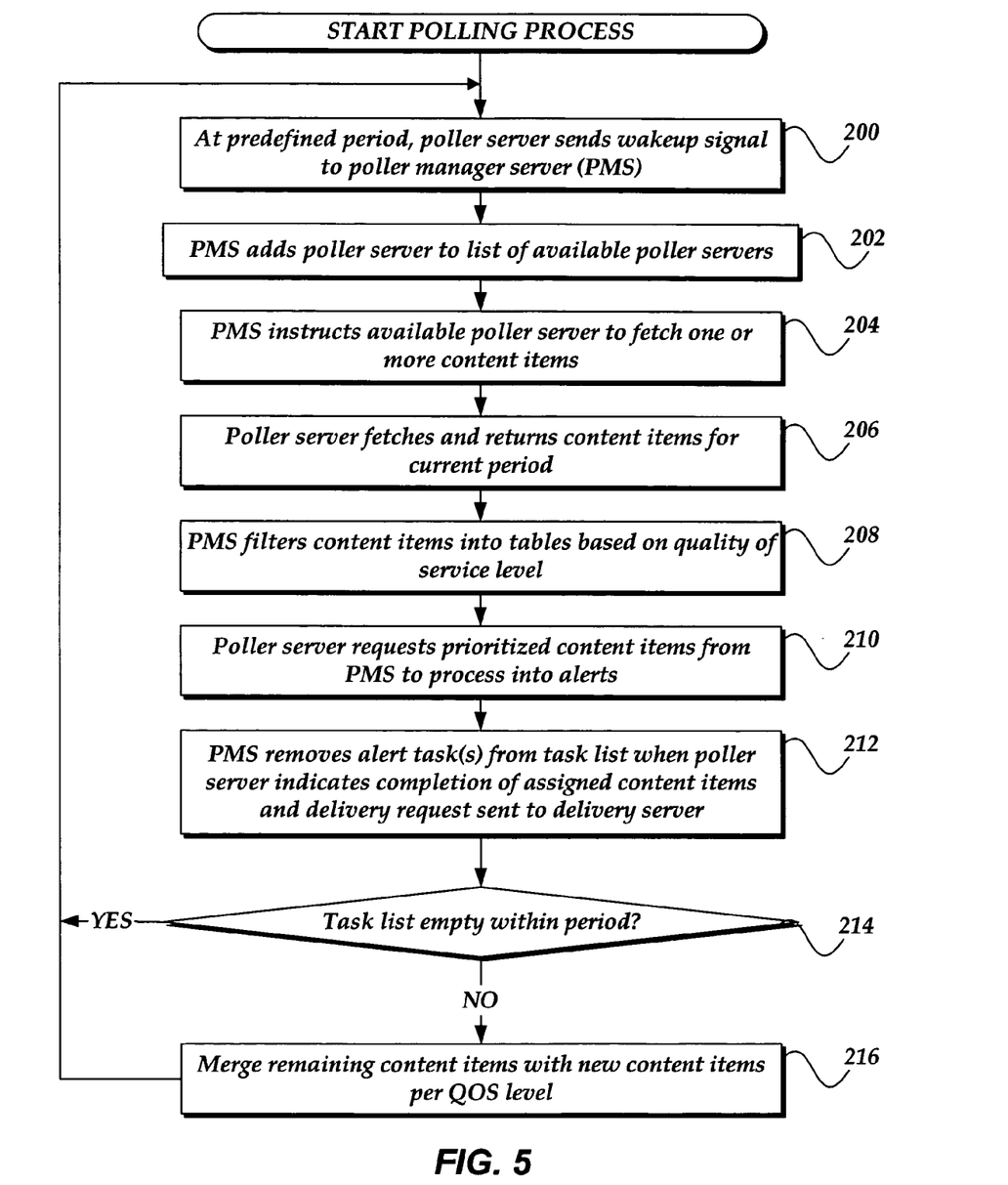
FIG. 5 is a flow diagram illustrating logic for preparing a time based alert.

FIG. 5 is a flow diagram illustrating logic for preparing a time based alert. At an operation 200, a poller server wakes up after a predefined period elapses and sends a wakeup signal to the primary PMS. If the primary PMS is down, the wakeup signal is routed to the secondary PMS. The wakeup signal indicates that the poller server is available to poll for content corresponding to one or more predefined alert types. Wakeup signals can be throttled so that the PMS is not overrun with wakeup signals all at once. When the PMS receives a wakeup signal, the PMS adds the currently available poller server to a poller server list in the PMS' memory at an operation 202. At an operation 204, the PMS sends a fetch_alerts_list request to have the first poller server on the PMS's list access one or more content items, such as personal advertisements, traffic reports, and the like. At an operation 206, the poller server receives the fetch request, accesses the desired content item(s), and sends the content item(s) back to the PMS. To access the content item(s), the poller server performs a query defined by stored user preferences and/or a consolidated query that is desired by numerous users. If no results are found from a query, the poller server can optionally broaden the query and try again. The content item(s) correspond the current predefined period, such as a 15 minute slot. The poller server can prioritize the content item(s) according to QOS levels before returning them to the PMS.

The PMS filters the returned content items from the number of poller servers into tables at an operation 208. The tables are based on QOS levels of alert types, user service plans, and the like. For example, the content items can be sorted into QOS table 3, QOS table 2, QOS table 1 and QOS table 0 corresponding to priority levels. Each content item would also have a timestamp assigned when the content item is added into one of the tables. The timestamp enables the PMS to track the length of time that the content item has been in a table without being processed into an alert. In general, a content item that stays in a table beyond a threshold length time, indicates that there are not enough poller servers for the load.

In addition to polling for content items at predefined intervals, the polling servers perform operations to prepare corresponding alerts to be delivered. Thus, at an operation 210, the poller servers send requests to the PMS to ask for work. The PMS generally sends content items from the tables to the poller servers based on the order of QOS levels. The poller servers can perform logical operations such as comparing old query results to the current content item(s). For example, if a current content item is different from an old query result, the poller server can replace the old query result with the current content item. Since scheduled alerts may not be delivered for a long period, the content may be updated a number of times before a corresponding alert is ultimately delivered. Once a poller server finishes its work, the poller server sends an acknowledgment to the PMS, indicating that the content item has been processed and an alert has been created. The poller server also sends a request to the delivery server to deliver an alert with the content item, and the poller server asks for more work. Upon receiving the acknowledgement, the PMS removes the content item from its corresponding table, at an operation 212, indicating that the corresponding alert task is complete.

At a decision operation 214, the PMS determines whether all content items from each table were removed, indicating that all tasks for each QOS level were completed. If each table is empty, processing returns directly to operation 200 to await another wakeup signal. If each table is not empty, the PMS was not able to complete all of its tasks, and the PMS may log an error. Any remaining unprocessed content items are merged, at an operation 216, with any new content items that are obtained during the next period.

Delivery Subsystem

Figure 6:
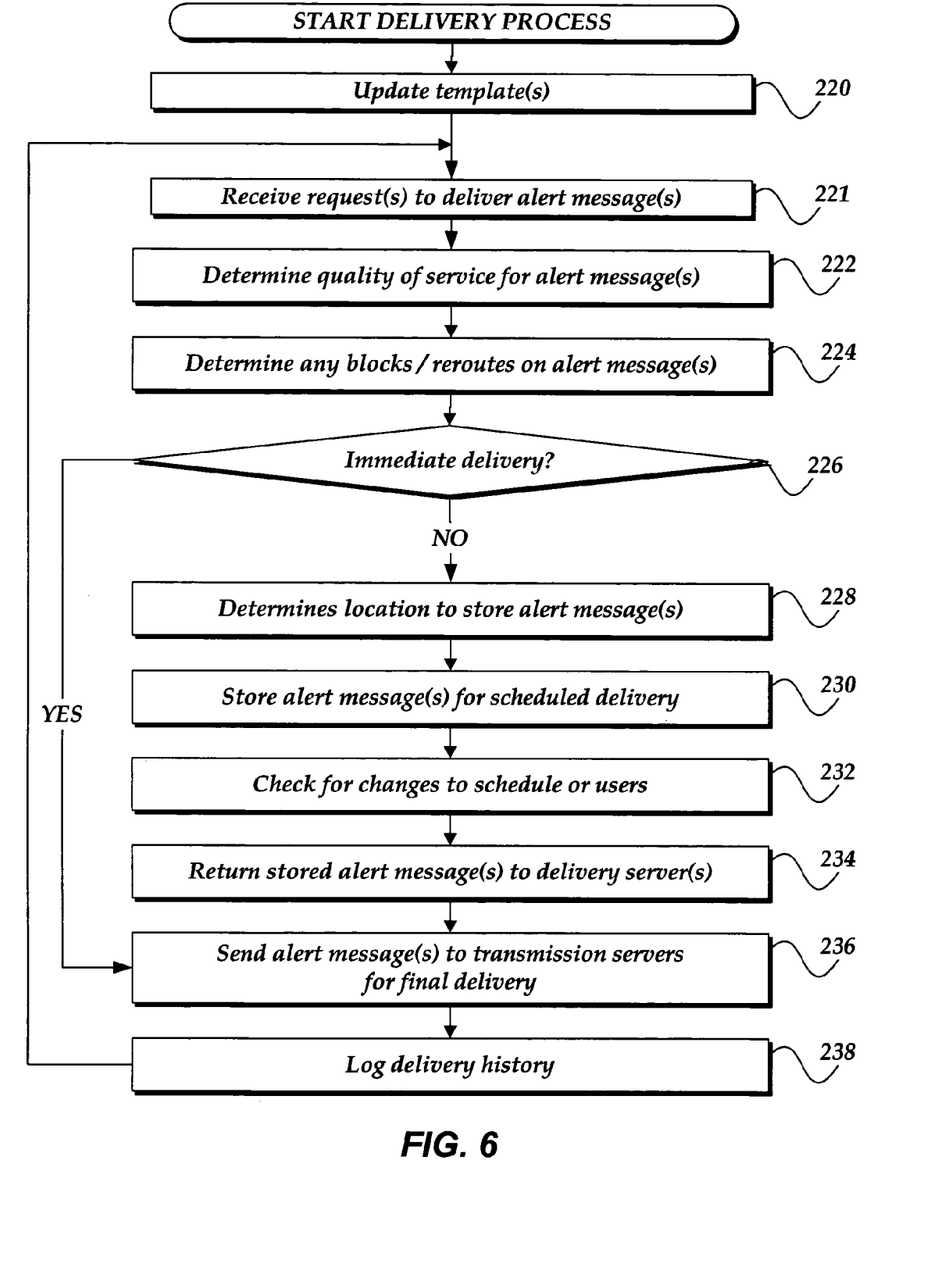
FIG. 6 is a flow diagram illustrating exemplary logic for delivering an alert to one or more users.

FIG. 6 is a flow diagram illustrating exemplary logic for delivering an alert to one or more users. As briefly discussed above, the delivery servers and storage servers generally comprise a delivery subsystem for interfacing with transmission servers to deliver alerts in a variety of methods. All components of the delivery subsystem can comprise any combination of hardware and/or software configurations. This flexibility enables deployment of alerts in varying circumstances, such as on international sites with limited hardware resources.

At an initialization operation 220, such as when a delivery server is newly installed or returned to service after being offline for some time, and/or at a certain predefined periods, the delivery servers receive updated templates from another live delivery server and/or from another source such as the administrative interface. All delivery servers should have the same set of templates automatically propagated throughout the delivery servers set.

At an operation 221, the delivery server(s) receive one or more requests from the matching engine and/or the poller to deliver one or more messages to one or more users. The requests generally include a set of keys and values associated with each key. The keys correspond to placeholders in delivery templates that correspond to delivery method, such as email, instant messenger, SMS, Web server, file transfer protocol (FTP) delivery, and the like. For example, a key-value pair of <fullname, John Smith> in a request will be used to replace a 'fullname' placeholder in a selected delivery template. The delivery templates can be written in well known template languages such as personal home page hypertext processing (PHP), JAVA™ server pages (JSP), HTML Force 2000 (HF2K), and/or a proprietary template language. The content type, such as stock quotes, news, classifieds, and the like, can be used by the delivery server to determine which set of delivery templates to use. For each content type, a set of delivery templates can be created for the different available delivery mechanisms such as HTML page server, text file transfer, Instant Messenger, SMS, and the like. However, the delivery servers generally do not have any knowledge of a specific alert document to be processed. Instead, the delivery servers simply see a document comprising the content and the user ID list. This combination of content document and user ID list is sometimes referred to as a ProcessMatchList. As described above, the user ID list comprises those user IDs that matched a specific content feed. The content document comprises a set of key-value pairs that represent the actual content of the alert to be sent. There can be a set of key-value pairs for each delivery method, including, but not limited to, one pair for email delivery, one pair for wireless delivery, one pair for IM, and one pair for web history, which is explained below. In addition to the key-value pairs identified in Table 1 above, the ProcessMatchList also generally includes the following information from a user's profile for delivery purposes:

User ID code from user database;
Country code for delivery;
Partner ID associated with the alert content and/or delivery method;
A User category;
QOS level;
Scheduled versus immediate delivery flag;
Premium service package information;
Pass through billing information that may be need such as for mobile delivery.

The information above can also be used for logging/statistical purposes, to determine the actual template used to format the alert content, for any billing activity on the last leg of the delivery path through mobile service providers, email providers, and the like.

Upon receipt of a ProcessMatchList, the delivery servers determine, at an operation 222, the QOS level associated with each user and/or delivery method identified in the ProcessMatchList. The delivery server will process requests in accordance with QOS levels in both inbound and outbound queues. A message from the match servers generally ends up in the appropriate inbound queue according to the priority level of the users that the queue contains. An alert generated from the delivery server generally ends up in the appropriate outbound queue according to whether the alert is to be send via email, wireless SMS, IM, and/or the like. In addition, or alternatively, the delivery servers can ensure that premium users will have special delivery options if, for example, the user database is down. The storage servers store a last known email address, wireless device number, and/or the like, that is known about each user. The delivery server retrieves that information from the storage server in case the delivery server cannot get the information from the user database. The delivery server can also enforce a message limit per alert, per wireless device, per user, and/or the like. The delivery server will interface with the storage server to store/retrieve message limit information.

At an operation 224, the delivery server determines whether any kind of block or rerouting has been placed on delivery of alerts to certain users and/or through certain delivery methods. For example, a user may have indicated quiet time during which the user does not wish to receive any alerts, such as during evening hours. Similarly, a user may be on vacation, and has requested that no alerts be delivered until the user returns. The delivery server can also determine whether alerts should be forwarded through any number of delivery methods beyond the user's primarily preferred method.

At a decision operation 226, the delivery server determines which alerts are to be sent immediately and which are to be sent at a scheduled time. Those alerts that are scheduled for later delivery will be stored on the delivery storage servers. There are at least two ways to implement the delivery storage servers, referred to herein as option A and option B.

Option A:

For scheduled alerts, a resource manager server (RMS) determines, at an operation 228, which users' alerts get stored on which storage servers. Any delivery server that needs to store an alert for a user, will first lookup the user's corresponding alert settings in the user database to locate a StorageId where alerts are to be stored. If no such StorageId exists, then the delivery server contacts the RMS to get a StorageId. The RMS will decide which storage server on which the user's alerts will be stored, depending on the current load/usage of each of the registered storage servers. A serverId will be returned to the delivery server which will then store the StorageId in the alerts settings in the user database. For failover purposes, or if the RMS is down or non-responding, an RMS API will ensure that the last issued StorageId is passed as a result on any subsequent queries to the RMS, until it comes back up.

Once the appropriate storage server is identified, the delivery server stores the user's alert(s), and (optionally) their delivery options, to that storage server, at an operation 230. In addition to simply waiting for later delivery, stored alerts may be compared to newer alerts to ensure the most recent content. For example, a user should receive only one single alert for a news story that was updated multiple times in a day, although multiple matches may be generated from the updates over a period of time before the scheduled delivery time.

As with the delivery servers, the storage servers generally will have no knowledge of any alert-specific information. The storage servers will make every attempt to store information in a share memory (e.g., shm) for fast retrieval, and use disk storage as little as possible. For efficiency, any information common to a large number of users, such as content feed information, can be stored once and indexed to the users. In one embodiment, there can be at least four storage areas in each server, which can be implemented via a combination of shared memory and disk write back:

- Feed storage: each collection of key-value pairs would stored once for the whole set of users matched to the type of content feed.
- User Storage: an entry for each user interested in receiving a scheduled alert. This area is needed for fast access to a user's record in case they decide to delete/edit the alert.
- Time storage: each user interested in receiving a scheduled alert will have a record stored under the appropriate time slot and the appropriate service queue.
- Web Storage: Every delivered alert will have a permanent record with a pointer to the feed that created it, for usage on a web front end.

For failover and faster retrieval of scheduled alerts, any of the servers can be mirrored. Each server can act on a subset of alerts, such as via a modulo algorithm. For each action, such as delivering a scheduled alert, a server will replicate the action to one or more peer mirrors. A heartbeat mechanism is generally established between processes that perform scheduled deliveries, so that if a server goes down or the process fails for some reason, the remaining processes on the mirror servers will continue doing the work. This takes advantage of the mirror servers, not only for failover, but also to multiply (e.g., double, triple, etc.) the available processing power.

Option B:

In an alternate embodiment of the delivery storage server, a relational database stores feed content relative to alert matching results. Conceptually, three types of tables are used to associate feed content, user alert matches, and delivery schedule times. Accordingly, the three types of tables are called Feed table, AlertMatches table, and TimeSlot table. The Feed table contains each content feed that is received by the storage server. Each content feed is uniquely identified by a FeedId. A sample Feed table data structure is shown in Table 2.

TABLE 2

Sample Feed Table Data Structure

| Data Field | Data Type |
| --- | --- |
| FeedId | Text |
| FeedContent | Text |
| ExpirationDate | Timestamp |
| CreationTime | Timestamp |

The AlertMatches table stores the user matches for every alert. A user's alert is referenced by a unique AlertId. For each AlertId there maybe 0 or more content feeds. Several matches for one AlertId will be represented by multiple rows in the AlertMatches table, each row having a different FeedId. Each tupel <AlertId, FeedId> is unique in the AlertMatches table and ties a user's alert to the corresponding content feed. A sample AlertMatches table data structure is shown in Table 3.

TABLE 3

Sample AlertMatches Table Data Structure

| Data Field | Data Type |
| --- | --- |
| AlertId | Text |
| FeedId | Text |
| CreationTime | Timestamp |

Timeslot tables store the alert ids of all users associated with a delivery time slot. Each 15 minute delivery time slot during the day corresponds to one Timeslot table. For example, a table TimeSlot_9_45 includes all alert ids that have delivery preferences set to 9:45 am. At the start of each delivery slot, a number of processes begin processing the alert ids in a TimeSlot table. To coordinate these processes, a 'ClaimedBy' field in the TimeSlot table allows each process to check whether another process is already working on a specific alert id. If the ClaimedBy field is empty, this alert id is available to be processed by the next available process. A sample TimeSlot table data structure is shown in Table 4.

TABLE 4

Sample TimeSlot Table Data Structure

| Data Field | Data Type |
| --- | --- |
| AlertId | Text |
| QosLevel | Int |
| Dst | Int |
| ClaimedBy | Int |

While alerts are in storage, the delivery storage server will also get updates from the user database, at an operation 232. One reason for this is to remove user entries whenever a user deletes an alert or whenever a user decides to change the delivery time of a scheduled alert. At predefined delivery periods, such as every hour, the storage servers access those stored alerts that are to be delivered at that period, and mark those stored alerts for immediate delivery. The storage servers then send those marked alerts to the delivery servers at an operation 234. At an operation 236, the delivery servers apply a template to format the outgoing alerts according to the pre-selected delivery method if the template was not previously applied. The delivery servers then communicate the immediate delivery alerts to the transmission servers for delivery via email, instant message, SMS, and/or whichever delivery method(s) are associated with each alert.

Once an alert has been sent out by a delivery server, an "addToHistory" request is sent to the storage servers, at an operation 238, to update the user's history with the fact that an alert has been sent out. The "addToHistory" request also comprises a set of key-value pairs, so that different alert types can store different sets of information. Once again, the delivery server generally has no knowledge of the specific alert for which it is sending the "addToHistory" request. The set of key-value pairs that need to be stored are defined by the matching side. Every request to the delivery server should also be accompanied by any set of key names that need to be stored for the specific alert.

The history information can also be broadcast from the storage servers to other services. For example, history results can be served to front end Web pages and/or other Web Portal pages, either directly from a mirrored set of storage servers, or from a separate set of storage servers that serve history results. A shared memory can hold as many users' history results as possible (updated live as "addToHistory" requests come in from the delivery servers), and at the same time history results can be written to disk for permanent storage. If a user's top N history results are not in shared memory, the history results can be accessed from the user's permanent storage file. As indicate above, the results will be returned in key-value pairs, and it will be up to the receiving side to format the results in manner that is appropriate to the receiving side. For example, an actual news alert might have been sent to a user with a URL and an abstract of the last 3 news alerts that the user has received, whereas a history page might only need to present the URL. Independent formatting enables new alert types to be added without altering what is stored in the history files, thereby accommodating a new alert type with new requirements for history reporting. In general, the key-value approach will fit future needs.

A number of measures are employed to ensure that information is not lost in an event of a catastrophic failure, a corruption problem, or even a need to upgrade the servers. As indicated above, each storage server is mirrored at least by one other server, so that a server can be taken down while its mirror(s) handle the traffic. Backups of the shared memory and replication files can be employed. For example, at least twice daily backups of the shared memory can be employed, as well as at least 24 hours worth of incoming replication volume files, enable recreation of the shared memory as fast as possible to bring a server back online.

Other recovery capabilities ensure complete processing of delivery requests. For instance, a deliver server marks an alert as "done" only when all user IDs associated with the corresponding content document have been processed. The monitor and/or other utilities can monitor the state of unsent alerts and have alert processing repeated if necessary. This recovery capability can also be applied to the transmission servers.

In addition to ensuring recovery, mirror sets can be used for scalability. To handle increased traffic from the match servers, any number of additional delivery servers can be added at any time. Conversely, any delivery server can be taken offline at any time for any maintenance reason. The remaining live servers will handle the incoming traffic from the match servers.

To handle increased user registration, any number of storage servers can be added horizontally, wherein more total mirror sets are added. To handle increased scheduled alert activity, storage servers can also be added vertically, wherein more mirror servers are added per set.

Illustrative Server Environment

Figure 7:
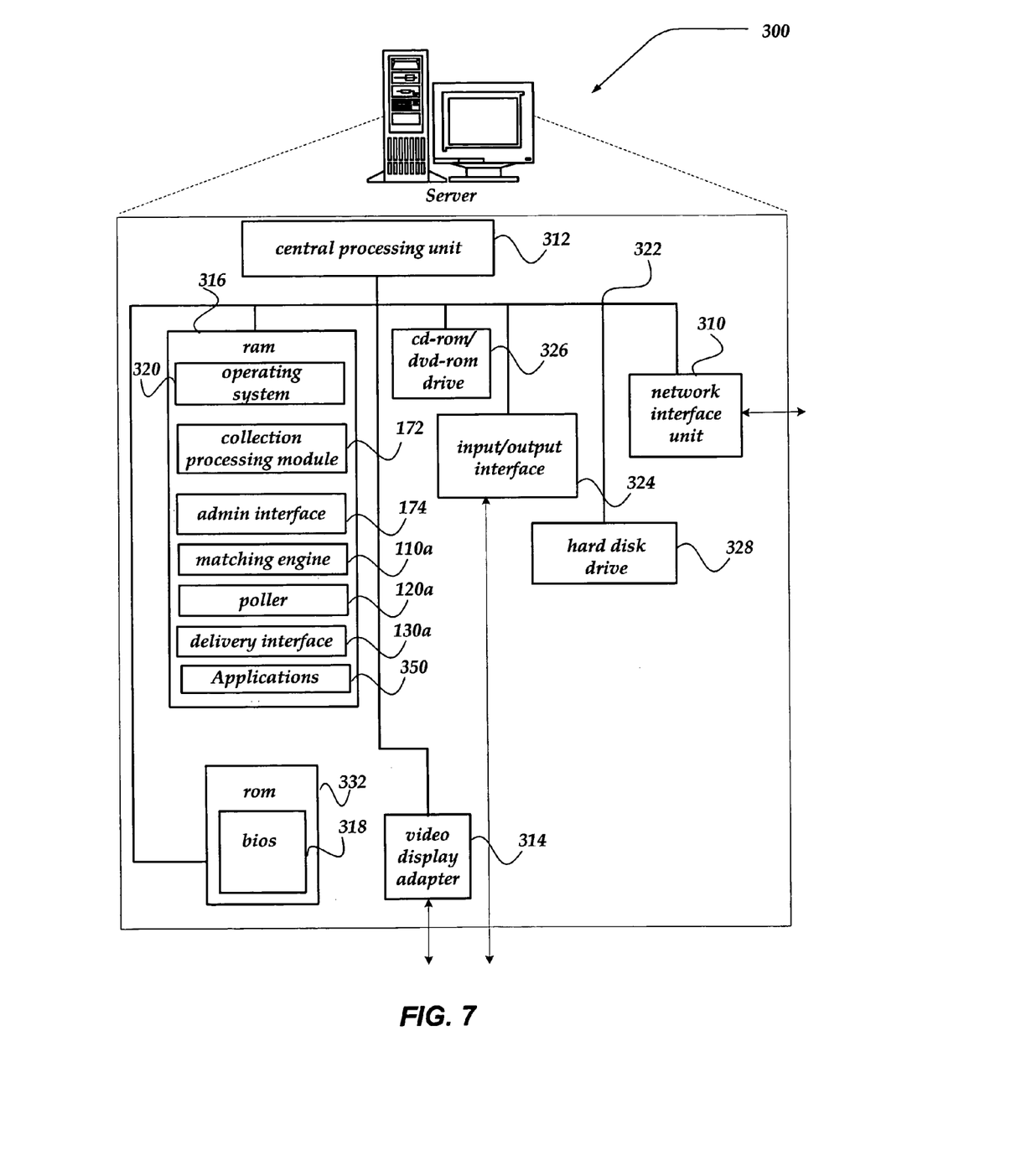
FIG. 7 shows a functional block diagram of an exemplary server according to one embodiment of the invention.

FIG. 7 shows a functional block diagram of an exemplary server 300, according to one embodiment of the invention. Server 300 can comprise any one or more of the servers discussed above, such as the matching servers, the feed storage servers, the poller, the delivery servers, the storage servers, the transmission servers, and the like. Client devices can be similarly configured. Server 300 may include many more components than those shown. The components shown, however, are sufficient to disclose an illustrative embodiment for practicing the invention. Server 300 includes a processing unit 312, a video display adapter 314, and a mass memory, all in communication with each other via a bus 322. The mass memory generally includes RAM 316, ROM 332, and one or more permanent mass storage devices, such as an optical drive 326, a hard disk drive 328, a tape drive, and/or a floppy disk drive. The mass memory stores an operating system 320 for controlling the operation of server 300. Any general-purpose operating system may be employed. A basic input/output system ("BIOS") 318 is also provided for controlling low-level operation of server 300. As illustrated in FIG. 6, server 300 can communicate with the Internet, or some other communications network, such as network 160 of FIG. 1, via a network interface unit 310, which is constructed for use with various communication protocols including transmission control protocol/Internet protocol (TCP/IP). Network interface unit 310 is sometimes known as a transceiver, transceiving device, network interface card (NIC), and the like. Server 300 also includes input/output interface 324 for communicating with external devices, such as a mouse, keyboard, scanner, or other input devices not shown in FIG. 1.

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory, or other memory technology, CD-ROM, digital versatile disks (DVD), or other optical storage, magnetic cassettes, magnetic tape, magnetic disk storage, or other magnetic storage devices, or any other medium which can be used to store the desired information and which can be accessed by a computing device.

The mass memory also stores program code and data. One or more applications 350 are loaded into mass memory and run on operating system 320. Examples of application programs include database programs, schedulers, transcoders, email programs, calendars, web services, word processing programs, spreadsheet programs, and so forth. Mass storage may further include applications such as collection processing module 172, admin interface 174, matching engine 110a, poller 120a, delivery interface 130a, and the like.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method for making an alert message accessible, comprising
   normalizing content that is accessible in a plurality of formats;
   indexing the content according to at least one characteristic of the content;
   using the at least one characteristic to determine whether previously stored content exists that is also indexed to the at least one characteristic, and if the previously stored content exists, evaluating the previously stored content to replace at least a portion of the previously stored content if the content includes a revision to the previously stored content and the previously stored content has not been delivered in an alert message;
   associating at least one portion of the content with at least one user, wherein the at least one portion of the content is associated with at least one predetermined interest of the at least one user;
   generating an alert message to the at least one user, wherein the alert message is related to the at least one portion of the content and the at least one user has selected to receive the alert message; and
   enabling the at least one user to access the alert message with at least one delivery mechanism predefined by the at least one user.

2. The method of claim 1, further comprising at least one of:
   receiving the content as an event based feed; and
   requesting the content as a time based feed.

3. The method of claim 1, wherein normalizing the content comprises converting the content from any one of the plurality of formats to a normalized format.

4. The method of claim 3, wherein enabling the at least one user to access the message comprises one of:
   delivering the alert message to the at least one user immediately; and
   delivering the alert message to the at least one user at a predefined time.

5. The method of claim 1, wherein the at least one characteristic of the content comprises at least one of:
   time at which the content was received;
   an identifier of the sender;
   a type of the content;
   a country from which the content was sent;
   an indication that the content is associated with a poll request; and
   an indication that the content is associated with previously received content.

6. The method of claim 1, wherein associating the at least one portion of the content comprises:
   evaluating the at least one portion of the content relative to a query expression wherein the query expression represents the at least one interest of the at least one user; and
   establishing an association between the at least one portion of the content and the at least one user if the at least one portion of the content matches the query expression.

7. The method of claim 6, wherein the query expression is accessed from a user profile of the at least one user.

8. The method of claim 1, wherein at least one of:
   associating the at least one portion of the content is performed according to a quality of service level;
   generating the alert message is performed according to a quality of service level; and
   enabling the at least one user to access the alert message is performed according to a quality of service level.

9. The method of claim 1, wherein enabling the at least one user to access the alert message comprises delivering the alert message as at least one of:
   an email message;
   an instant message;
   a short message service message; and
   a voice message.

10. The method of claim 1, further comprising at least one of:
    validating that necessary data are included in the content;
    transforming the content according to logical operations to express a characteristic of the content;
    logging receipt parameters of the content;
    storing the content;
    prioritizing the content relative to other content; and
    discarding a duplicate of the content.

11. The method of claim 1, further comprising mirroring the operations of normalizing, associating, generating, and enabling.

12. A computer readable medium comprising volatile and/or non-volatile storage, which stores computer readable instructions that enable a computing device to perform the actions of:
    normalizing content that is accessible in a plurality of formats;
    indexing the content according to at least one characteristic of the content;
    using the at least one characteristic to determine whether previously stored content exists that is also indexed to the at least one characteristic, and if the previously stored content exists, evaluating the previously stored content to replace at least a portion of the previously stored content if the content includes a revision to the previously stored content and the previously stored content has not been delivered in an alert message;
    associating at least one portion of the content with at least one user, wherein the at least one portion of the content is associated with at least one predetermined interest of the at least one user;
    generating an alert message to the at least one user, wherein the alert message is related to the at least one portion of the content and the at least one user has selected to receive the alert message; and
    enabling the at least one user to access the alert message with at least one delivery mechanism predefined by the at least one user.

13. A system for making an alert message accessible, comprising:
    a communication interface for accessing content and communicating an alert message;
    a processor in communication with the communication interface; and
    a memory in communication with the processor and storing data and instructions that cause the processor to perform a plurality of functions including:
      normalizing content that is accessible in a plurality of formats;
      indexing the content according to at least one characteristic of the content;
      using the at least one characteristic to determine whether previously stored content exists that is also indexed to the at least one characteristic, and if the previously stored content exists, evaluating the previously stored content to replace at least a portion of the previously stored content if the content includes a revision to the previously stored content and the previously stored content has not been delivered in an alert message;

associating at least one portion of the content with at least one user, wherein the at least one portion of the content is associated with at least one predetermined interest of the at least one user;

generating an alert message to the at least one user, wherein the alert message is related to the at least one portion of the content and the at least one user has selected to receive the alert message; and enabling the at least one user to access the alert message with at least one delivery mechanism predefined by the at least one user.

14. The system of claim 13, wherein the instructions further cause the processor to perform the operations of at least one of:

receiving the content as an event based feed; and
requesting the content as a time based feed.

15. The system of claim 13, wherein the instructions further cause the processor to perform the operations of at least one of:

converting the content from any one of the plurality of formats to a normalized format.
validating that necessary data are included in the content;
transforming the content according to logical operations to express a characteristic of the content;
logging receipt parameters of the content;
storing the content;
prioritizing the content relative to other content; and
discarding a duplicate of the content.

16. The system of claim 13, wherein the at least one characteristic of the content comprises at least one of:

time at which the content was received;
an identifier of the sender.
a type of the content;
a country from which the content was sent;
an indication that the content is associated with a poll request; and
an indication that the content is associated with previously received content.

17. The system of claim 13, wherein the instructions further cause the processor to perform the operations of:

evaluating the at least one portion of the content relative to a query expression wherein the query expression represents the at least one interest of the at least one user, and
establishing an association between the at least one portion of the content and the at least one user if the at least one portion of the content matches the query expression.

18. The system of claim 13, wherein the instructions further cause the processor to perform the operations of:

associating the at least one portion of the content is performed according to a quality of service level;
generating the alert message is performed according to a quality of service level; and
enabling the at least one user to access the alert message is performed according to a quality of service level.

19. The system of claim 13, wherein the instructions further cause the processor to perform the operations of:

delivering the alert message to the at least one user immediately; and
delivering the alert message to the at least one user at a predefined time.

20. The system of claim 13, further comprising a mobile client device for receiving the alert message.

21. The system of claim 13, further comprising:

a mirrored communication interface in communication with the communication interface, and also configured for accessing the content and for communicating a mirrored alert message;

a mirrored processor in communication with the mirrored communication interface; and a mirrored memory in communication with the mirrored processor and storing data and instructions that cause the mirrored processor to perform a plurality of functions including:

normalizing the content that is accessible in a plurality of formats;

indexing the content according to at least one characteristic of the content;

associating the at least one portion of the content with the at least one user, wherein the at least one portion of the content is associated with the at least one predetermined interest of the at least one user;

generating the mirrored alert message to the at least one user, wherein the mirrored alert message is related to the at least one portion of the content and the mirrored alert message is substantially equivalent to the alert message; and enabling the at least one user to access the mirrored alert message with the at least one delivery mechanism predefined by the at least one user.

22. A system for providing a message, comprising:

a collection processing module that interfaces with at least one content source, accesses content in a plurality of formats, normalizes at least one portion of the content into a normalized format, and indexes the content according to at least one characteristic of the content and uses the at least one characteristic to determine whether previously stored content exists that is also indexed to the at least one characteristic, and if the previously stored content exists, evaluates the previously stored content to replace at least a portion of the previously stored content if the content includes a revision to the previously stored content and the previously stored content has not been delivered in an alert message;

a matching engine that is in communication with the collection 1 that generates an alert message with the at least one portion of the content when the at least one portion of the content corresponds to an event based feed, wherein the at least one portion of the content is associated with at least one user based on at least one interest of the at least one user;

a poller that is in communication with the collection processing module and that generates an alert message with the at least one portion of the content when the at least one portion of the content corresponds to an time based feed, wherein the at least one portion of the content is associate with the at least one user based on the at least one interest of the at least one user; and a delivery interface that is in communication with the matching engine and the poller, and that delivers the alert message to the at least one user in accordance with a data structure predefined by the at least one user.

* * * * *

UNITED STATES PATENT AND TRADEMARK OFFICE
CERTIFICATE OF CORRECTION

| | | |
|---|---|---|
| PATENT NO. | : 7,143,118 B2 | Page 1 of 1 |
| APPLICATION NO. | : 10/866064 | |
| DATED | : November 28, 2006 | |
| INVENTOR(S) | : Matthias Eichstaedt et al. | |

It is certified that error appears in the above-identified patent and that said Letters Patent is hereby corrected as shown below:

Column 14; Line 14-36 (Approx.); Delete "Server 300....shown in FIG. 1." and insert the same as new paragraph.

Column 15; Line 4; In Claim 1, after "comprising" insert -- : --.

Column 17; Line 24; In Claim 15, delete "format." and insert -- format; --, therefor.

Column 17; Line 35; In Claim 16, delete "sender." and insert -- sender; --, therefor.

Column 17; Line 47; In Claim 17, delete "user," and insert -- user; --, therefor.

Column 18; Line 12; In Claim 21, delete "minored" and insert -- mirrored --, therefor.

Column 18; Line 22; In Claim 21, delete "minored" and insert -- mirrored --, therefor.

Column 18; Line 27; In Claim 21, delete "minored" and insert -- mirrored --, therefor.

Column 18; Line 47 (Approx.); In Claim 22, delete "1" and insert -- processing module and --, therefor.

Signed and Sealed this

Twelfth Day of June, 2007

JON W. DUDAS
*Director of the United States Patent and Trademark Office*